United States Patent [19]

Lautzenhiser

[11] Patent Number: 4,458,340
[45] Date of Patent: Jul. 3, 1984

[54] BOREHOLE SONIC METHOD FOR POROSITY CHARACTERIZATION

[75] Inventor: Theodore V. Lautzenhiser, Tulsa, Okla.

[73] Assignee: Standard Oil Company, Chicago, Ill.

[21] Appl. No.: 367,135

[22] Filed: Apr. 9, 1981

Related U.S. Application Data

[63] Continuation of Ser. No. 170,359, Jul. 21, 1980, abandoned.

[51] Int. Cl.$^3$ .............................................. G01V 1/40
[52] U.S. Cl. ....................................... 367/32; 367/31; 367/49
[58] Field of Search ...................... 367/28, 31, 49, 32; 181/105, 121, 401; 166/250; 324/338; 364/43, 51, 58.5, 22

[56] References Cited

U.S. PATENT DOCUMENTS

| | | | |
|---|---|---|---|
| 2,455,941 | 12/1948 | Huseat et al. | 324/338 |
| 3,073,406 | 1/1963 | Westfbad | 367/28 |
| 3,114,875 | 12/1963 | Haagensen | 324/338 |
| 3,832,677 | 8/1974 | Brender et al. | 181/105 |
| 3,909,775 | 9/1975 | Lauigne | 181/105 |
| 3,909,776 | 9/1975 | Broding et al. | 181/105 |
| 3,938,072 | 2/1976 | Baird et al. | 181/401 |
| 4,013,950 | 3/1977 | Falls | 324/332 |
| 4,045,724 | 8/1977 | Shuck et al. | 324/338 |
| 4,168,483 | 9/1979 | Parthasarathy et al. | 367/26 |
| 4,255,798 | 3/1981 | Havira | 367/32 |
| 4,319,346 | 3/1982 | MacDonald | 367/32 |
| 4,328,567 | 5/1982 | Dodge | 367/32 |
| 4,363,112 | 12/1982 | Widrow | 367/49 |
| 4,369,497 | 1/1983 | Poupon et al. | 324/338 |

FOREIGN PATENT DOCUMENTS

| | | | |
|---|---|---|---|
| 2283449 | 1/1974 | France | 367/49 |
| 2034888 | 6/1980 | United Kingdom | 181/105 |
| 544925 | 1/1978 | U.S.S.R. | 367/32 |
| 651282 | 3/1979 | U.S.S.R. | 367/49 |

OTHER PUBLICATIONS

Chaney et al., "Some Effects of Frequency... Acoustic Logs", 4/66, pp. 407-411, Jour. of Petr. Tech.
Jachosky et al., "Frequency Analysis of Seismic Waves", 10/52, pp. 721-738, Geophysics, vol. 17, #4.
Morita et al., "Contact Resonance of Vibration...," 1977, pp. 601-605, Jour. Acoustical Soc. of Japan, vol. 33, #11.

Primary Examiner—Nelson Moskowitz
Attorney, Agent, or Firm—Timothy D. Stanley; Fred E. Hook

[57] ABSTRACT

A sonic transmitter and receiver are employed to locate and evaluate zones of significant porosity in the proximity of a borehole. Continuous wave and pulse techniques are used to locate the zones and to determine the void dimensions by means of frequency domain signatures. Both through-transmission and reflection methods are employed. The technique is considered especially useful for locating fluid-filled vugular zones.

9 Claims, 13 Drawing Figures

BOREHOLE SONIC METHOD FOR POROSITY CHARACTERIZATION

This is a continuation of application Ser. No. 170,359, filed July 21, 1980, now abandoned.

This invention relates to sonic techniques for geophysical exploration, and in particular to borehole sonic techniques for mapping and characterizing the surrounding subterranean structure.

BACKGROUND OF THE INVENTION

Sonic techniques have been extensively employed for geophysical measurements during the past 50 years. The best known of these methods is the technique of generating an acoustic impulse with an explosive source near the surface of the earth and then detecting and recording the resulting reflected acoustic signals which characterize subterranean layers.

A later development of this basic approach includes the use of a varying-frequency seismic vibrator as a surface acoustic source, wherein the received reflected signals are correlated with a replica of the vibrator frequency pilot signal to produce seismograms of underground structures similar to those obtained with explosives sources.

For the accurate interpretation of seismograms, it is highly desirable to known the velocity of sound waves in the various subterranean layers being mapped. A well-known and commonly used technique for determining the velocity profile of a particular geological region comprises the running of a "velocity log" in an existing borehole in the region. This is typically accomplished with a borehole tool that includes a relatively high-frequency sonic generator displaced a substantial vertical distance from a corresponding sonic signal receiver. Acoustic velocity measurements are obtained by determining the time delay associated with the transmission of the acoustic signal from the transmitter to the receiver.

Another borehole sonic tool in common use is the borehole televiewer. This tool includes a high-frequency sonic transducer that rotates in a plane perpendicular to the direction of the borehole while transmitting and receiving a series of high-frequency sonic pulses. The relative amplitudes of the received sonic pulses are used to characterize the rugosity of the borehole itself.

The above-mentioned techniques are useful for their designed purposes, but they in no way exhaust the possibilities for sonic geophysical exploration and characterization. In particular, the determination of the porosity of subterranean structures is highly desirable as a crucial indicator of potentially exploitable petroleum deposits. There is no currently available borehole sonic technique known to the Applicant for making porosity measurements in the medium surrounding a borehole. It was because of this apparent technological gap that the Applicant proceeded to develop the instant invention.

SUMMARY OF THE INVENTION

The Applicant has determined several variations of a new sonic logging technique for locating and characterizing subterranean vugular zones (i.e., regions of significant porosity). Each of these variations comprise an exploitation of a distinct frequency domain signature typifying such a vugular zone.

With one embodiment of the invention, a sonic wave generator transmits a swept frequency acoustical signal into the formation surrounding a borehole. When the generator reaches a position in the borehole near a gas filled vugular zone, a sonic standing wave occurs, in a relatively narrow frequency range, due to the large variation in transmission impedance caused by the vugular zone. This standing wave is detected by a standing wave ratio meter connected to the sonic wave generator. By use of this technique, the vertical location of vugular zones may be determined. Furthermore, the peak frequency, at which the highest standing wave ratio occurs, has an acoustical wavelength which corresponds with the size of the most commonly occurring cavities in the vugular zone. By using a broad-band swept frequency sonic signal, this approach is made useful for detecting a broad variety of vugular zones.

Another embodiment of the invention comprises the use of a sonic transmitter and a sonic receiver in the same borehole. With this technique, the transmitter and receiver are positioned a substantial distance apart in the borehole and the receiver is tuned to detect back-scattered sonic signals resulting from vugular zones in the vicinity of the borehole. This approach can suitably employ either a broad-band swept frequency sonic source or a pulsed sonic source that transmits a series of pulses of varied frequency content such that a broad frequency range is covered sequentially band by band. With either the swept frequency or pulsed approach, the presence of a vugular zone near the borehole will result in a scattering effect on the sonic signal. Part of this scattered energy will be detected by the receiver and the presence of a vugular zone will be vertifiable by an observed marked increase in the received scattered signal over a certain relatively narrow band in the received signal frequency spectrum. This frequency characteristic comprises the "signature" of the vugular zone.

A third embodiment of the invention comprises the placement of a sonic transmitter (either swept frequency or pulsed) in one borehole and sonic receivers in one or more other boreholes in the general vicinity of the borehole containing the transmitter. With this approach, it is a *through* signal rather than a scattered signal that is received—the "signature" of a vugular zone using this approach will therefore display a significant *attenuation* of the received signal about the resonant frequency of the particular vugular zone encountered. The "peak frequency" in this approach thus is identified from a *minimum* on the frequency response graph.

These and other aspects of the instant invention will become more clearly understood when considered in light of the attached Drawing and the following Brief Description of the Drawing and Detailed Description.

DETAILED DESCRIPTION

When an acoustic wave in a medium impinges on the boundary of a contiguous second medium, a reflected wave is generated in the first medium and a transmitted wave is generated in the second medium. The ratios of the respective intensities and pressure amplitudes of the reflected and transmitted waves to those of the incident wave depend upon the characteristic impedances of the two media and on the angle of incidence of the incident wave. The characteristic impedances of the two media in turn depend upon the densities and wave propagation velocities thereof. The transmitted wave has the same frequency as the incident wave, but, as a result of the difference between the wave propagation velocities in the two media, the propagation wavelengths are different. The coefficient of reflection of an acoustic wave for such an interface is proportional to the difference of the two characteristic impedances divided by the sum of the two characteristic impedances. Thus, two media with highly diverse characteristic impedances will have a high percentage of reflection at their interface.

Figure 1:
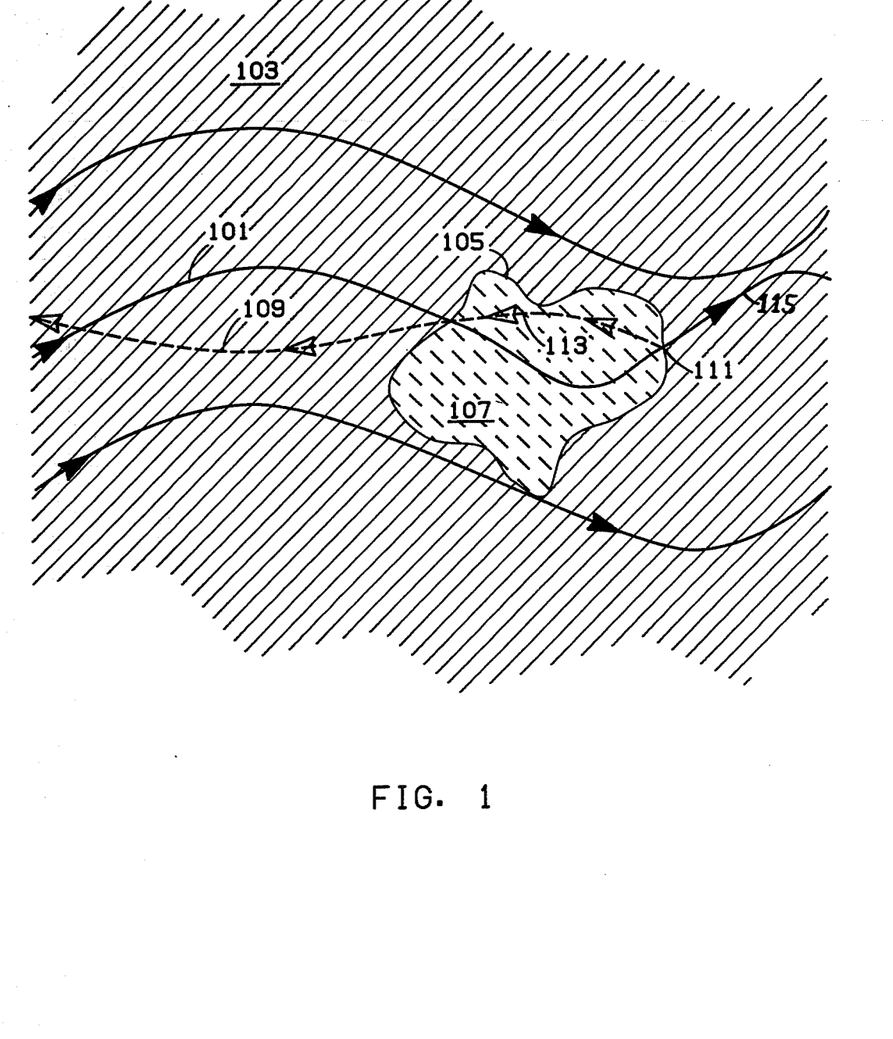
FIG. 1 depicts a sonic wave encountering a void such as found in vugular zones.

FIG. 1 depicts an acoustical wave 101 traveling through a solid medium 103 and encountering the interface 105 of the solid medium with a fluid-filled cavity 107. Part of the energy associated with the acoustical wave 101 is transmitted on through the fluid-filled cavity 107 and part of it is returned as reflected wave 109. As the transmitted wave passes through the fluid-filled cavity, its wavelength changes to a shorter length as shown. When this shorter wavelength acoustical signal impinges the fluid-solid interface at point 111, a second reflected wave 113 is generated. The remaining energy associated with transmitted wave 101 continues as through-wave 115 through the solid region from point 111 with a wavelength equal to the original wavelength of the transmitted wave prior to its entry into the fluid-filled cavity. The reflected wave 113 can be in phase with the reflected wave 109 as shown in FIG. 1. This in-phase phenomenon is not generally true—rather, it occurs only when the distance travelled by the wave across the breadth of the cavity corresponds to an odd multiple of a quarter wavelength of the acoustical wave *within* the cavity.

In a typical subterranean vugular zone the cavities therein *tend* to occur with substantially similar dimensions. The in-phase reflected waves (such as waves 113 and 109 in FIG. 1) resulting from an acoustical wave impinging upon a vugular zone thus tend to occur in concentrations around discrete locations in the frequency domain. By making measurements which determine the average magnitudes of these reflected waves for various frequencies, it is possible to find the resonant or "signature" frequency or frequencies of the particular vugular zone encountered. A similar, but inverted, signature for a vugular zone can be found by measuring the amplitude versus frequency response of a received acoustical signal that has been passed through a vugular zone. Furthermore, at and about its resonant frequency, a vugular zone tends to transmit scattered waves in all directions when stimulated by an acoustical wave. The vugular zone can thus also be identified by monitoring the magnitudes of these scattered waves as a function of the frequency of an acoustical wave impinging thereon.

Figure 2:
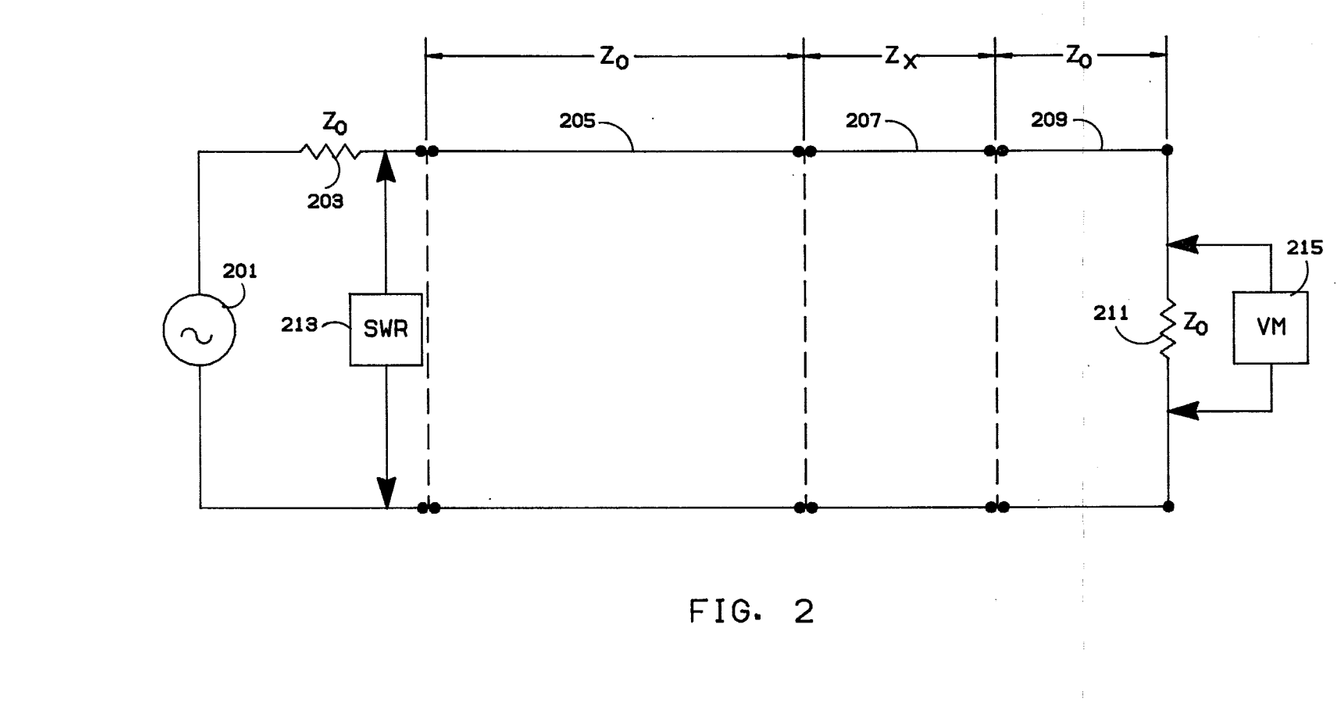
FIG. 2 depicts an approximate electrical transmission line analogue of the acoustical impedance changes corresponding to a localized vugular zone.

The above-described subterranean acoustical phenomena can be closely analogized with the electrical transmission line network depicted in FIG. 2. Therein, a variable frequency voltage source 201 with internal impedance 203 of value $Z_O$ is used to drive a transmission line 205 of characteristic impendance $Z_O$. An unmatched section of transmission line 207 with characteristic impedance $Z_X$ is inserted between line 205 and termination line 209. Line 209 has a characteristic impedance which is the same as that of line 205, and its termination impedance 211 also has the value $Z_O$. Without the insertion of line 207, the series connection of the source 201 through line 205 and 209 to the termination impedance 211 would result in a continous transfer of the signal from the source to the termination impedance with no reflections or standing waves. The insertion of section 207 into the system creates an unmatched situation resulting in significant reflections and standing waves whose values depend on the relative natures and magnitudes of the impedances $Z_O$ and $Z_X$. With the aid of standing wave ratio meter 213 and voltmeter 215, along with a knowledge of the impedance $Z_O$, the impendance $Z_X$ can be identified experimentally. This technique for identification of unknown impedances is well-known (and can be found in any elementary electric transmission line textbook); but to the Applicant's best knowledge this technique has never previously been used or suggested for use for the purpose of locating and characterizing subterranean vugular zones.

Figure 3:
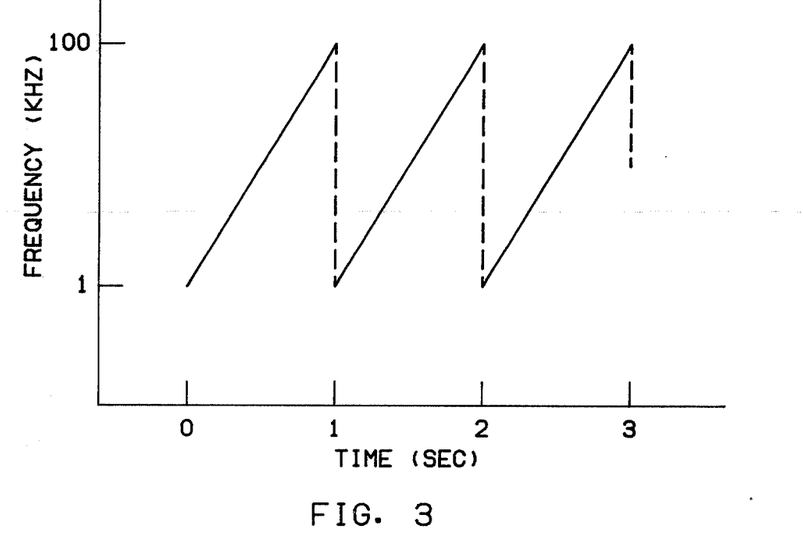
FIG. 3 shows a frequency sweep pattern for suitable use with the instant invention.

FIG. 3 shows a frequency sweep signal suitable for use with a continuous wave mode implementation of the instant invention. The signal shown covers the range of frequencies most likely to be appropriate for characterizing naturally occurring vugular zones.

Figure 4:
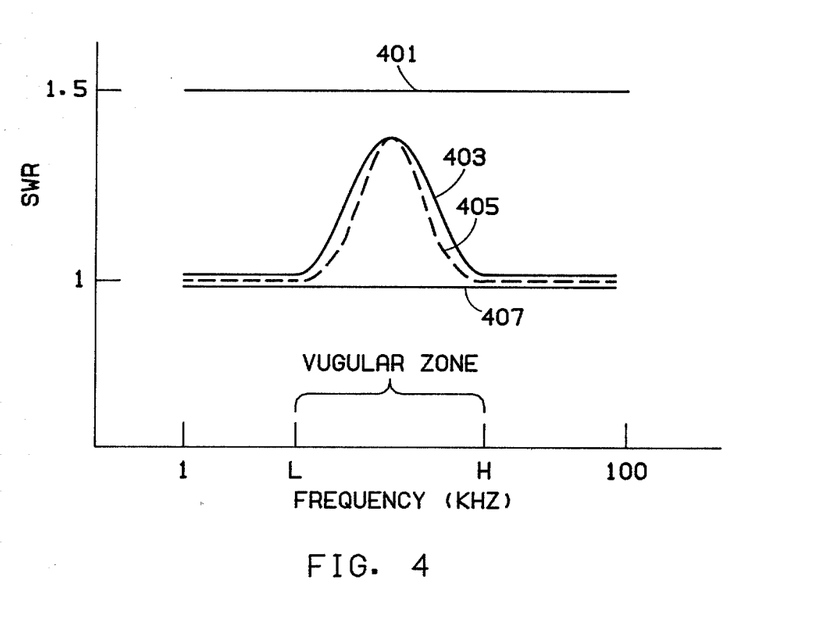
FIG. 4 shows examples of possible frequency domain "signatures" for various obstructions resulting from the signals shown in FIG. 3.

FIG. 4 shows various examples of frequency domain signatures likely to result from a continuous wave mode implementation of the instant invention employing a standing wave ratio meter as the sensing device. Trace 401 illustrates an expected signature of a planar interface of two different rock types or of a rock to fluid interface. Trace 403 depicts a signature of a vugular zone having a relatively broad range of cavity sizes. Trace 405 shows an example of a signature of a vugular zone having a more narrowly distributed range of cavity sizes. The breadth of the signature curve is also a function of cavity shape. The magnitude of the amplitude variation is directly proportional to the number of cavities per unit volume and inversely related to the distance between the source and the vugular zone. Trace 407 depicts a reference trace which would result if no interface or obstruction were present to cause reflections of the transmitted acoustical waves.

Figure 5A:
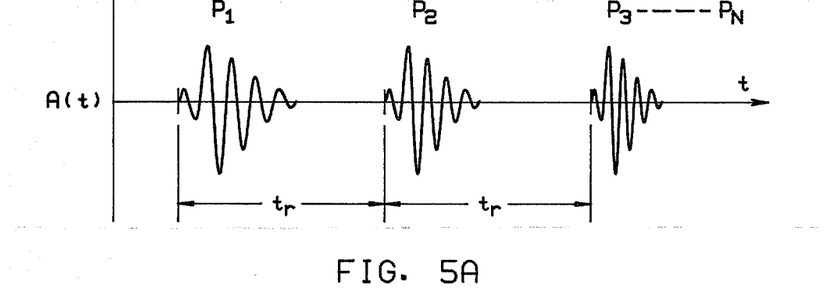
FIG. 5A shows an example of a pulse train suitable for use with the pulsed version of this invention.
Figure 5B:
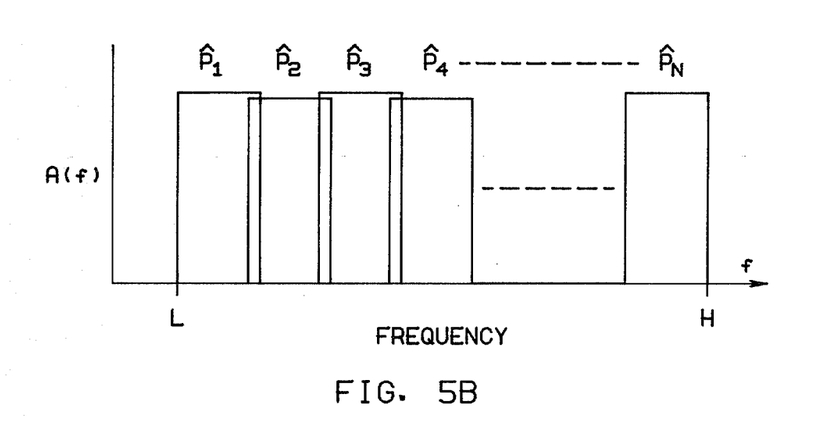
FIG. 5B depicts the frequency bands covered by the pulse train partially shown in FIG. 5A.
Figure 5C:
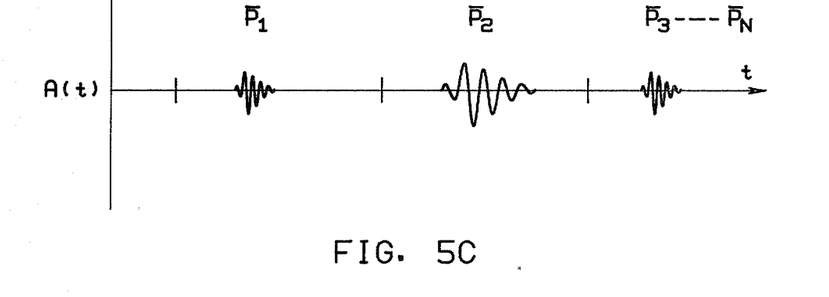
FIG. 5C depicts received pulses reflected from a vugular zone.

FIG. 5A shows a series of acoustical pulse waveforms suitable for use with a pulsed signal mode implementation of the instant invention. These pulses are picked with amplitude variations, A(t), which are different for each of a series of pulses ($P_1$ through $P_N$) such that each of the pulses is substantially restricted to its own particular band of frequencies as depicted ideally in FIG. 5B. These frequency bands ($P_1$ through $P_N$) overlap slightly as shown, and together cover the entire range from low frequency L to high frequency H. These pulses have a repetition rate which is slow enough to prevent interference between these successive pulses and primary reflections thereof. FIG. 5C shows a series of reflected pulses ($P_1$ through $P_N$) wherein the degree of reflection is clearly largest for reflected pulse $P_2$ corresponding to frequency band $P_2$ in FIG. 5B. The frequency characteristics of a vugular zone can thus be detected using pulse techniques as well as with the above-described continuous wave techniques. With the pulse mode implementation it is also possible to determine the approximate distance between the transmitter and the vugular region by measuring the time delay between the transmitted pulse and the received echo.

Figure 6:
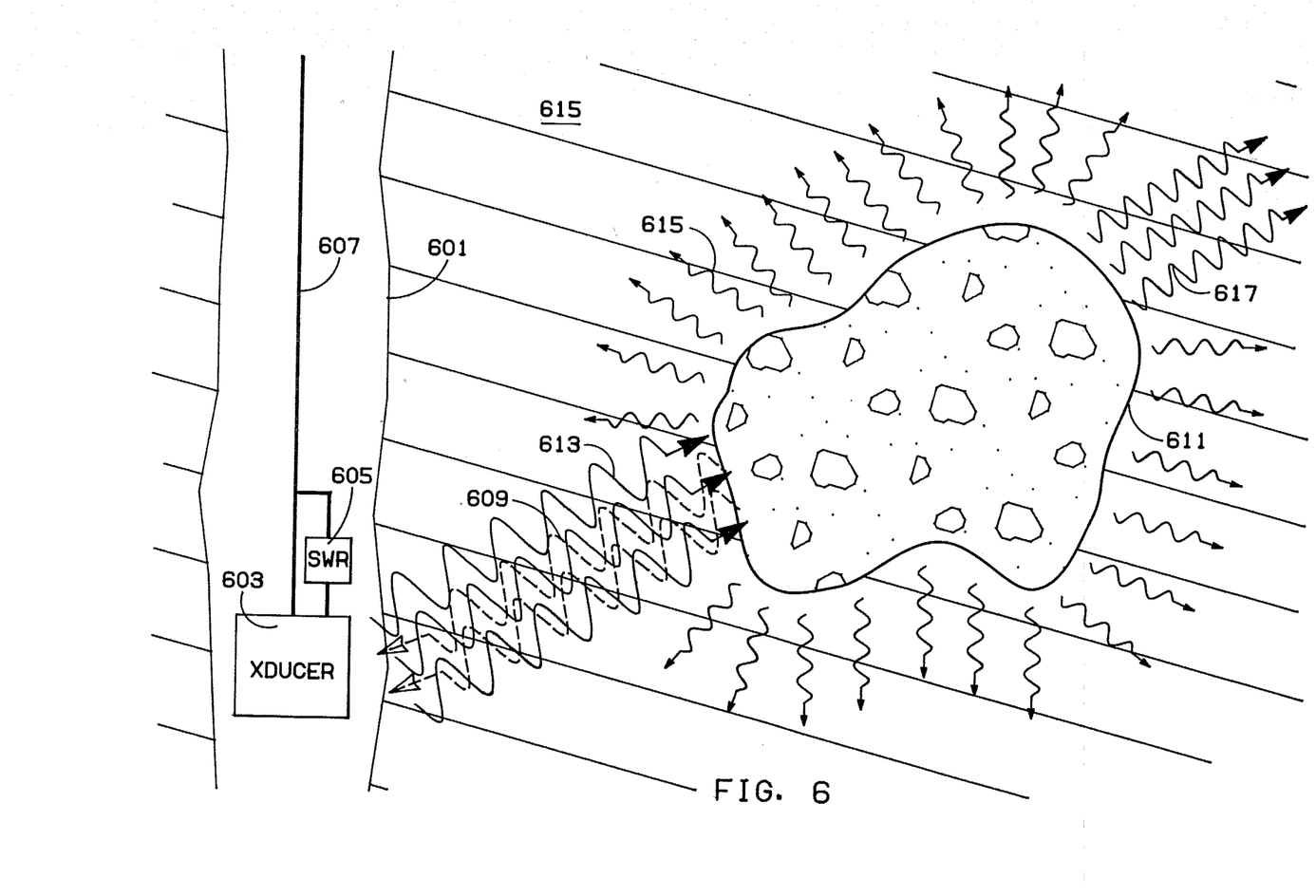
FIG. 6 depicts a standing wave resulting from a vugular zone's interference with a continuous sonic wave transmitted from a borehole.

FIG. 6 depicts an implementation of the method of the instant invention in a single borehole 601 in which a sonic transducer 603 and standing wave ratio detector 605 are suspended via logging cable 607 within the borehole. A swept-frequency acoustical signal 613 (such as that shown in FIG. 3) is transmitted into the medium 614 surrounding the borehole. Upon striking the vugular zone 611, part of the transmitted signal is returned as reflected signal 609, while part of the originally transmitted signal 613 is dispersed as scattered signals 615, the remainder passing as through-transmission signals 617. The standing wave ratio measured by standing wave ratio detector 605 is transmitted uphole via logging cable 607 to well-known logging data recording equipment (not shown). The identification of the vugular zone is then accomplished by means of the frequency domain signature techniques similar to those described above in the discussion of FIGS. 1 through 4.

Figure 7:
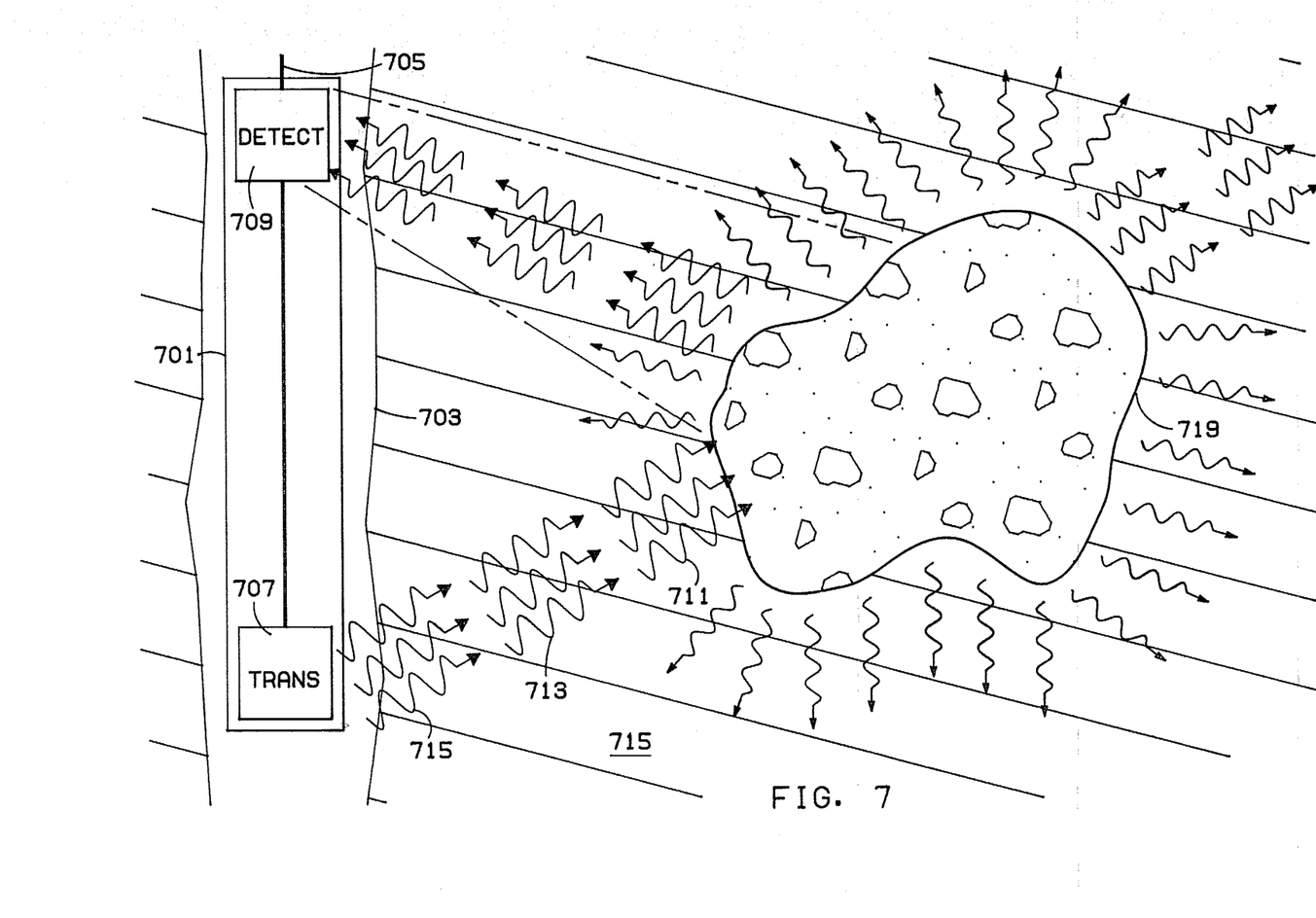
FIG. 7 depicts a single borehole technique for locating vugular zones, wherein an acoustical signal receiver is displaced from an acoustical signal transmitter in the borehole and scattered waves emitted from a vugular zone are detected.

FIG. 7 shows a pulse mode implementation of the method of the instant invention wherein a sonde 701 is lowered into a borehole 703 by means of a logging cable 705. Within the sonde 701 is a pulse-generating transducer 707 for generating travelling wave packets, and a sonic signal detector 709. The pulses 711, 713, 715, etc., (such as those depicted in FIG. 5) are transmitted by transducer 707 into the formation 717 surrounding the borehole. When these acoustical pulses strike the vugular zone 719, part of their energy travels through the vugular zone, part is reflected, and part is scattered in all directions due to the dispersing effects of the vugular zone on the travelling wave packets. The detector 709 is used to determine when such reflecting and scattering is occurring and to transmit to the up-hole recording equipment (not shown) all the scattered wave and reflected wave information sensed at the detector location. This arrangement allows the frequency response characteristics of the vugular zone to be monitored as discussed in the description above regarding FIG. 5.

Figure 8:
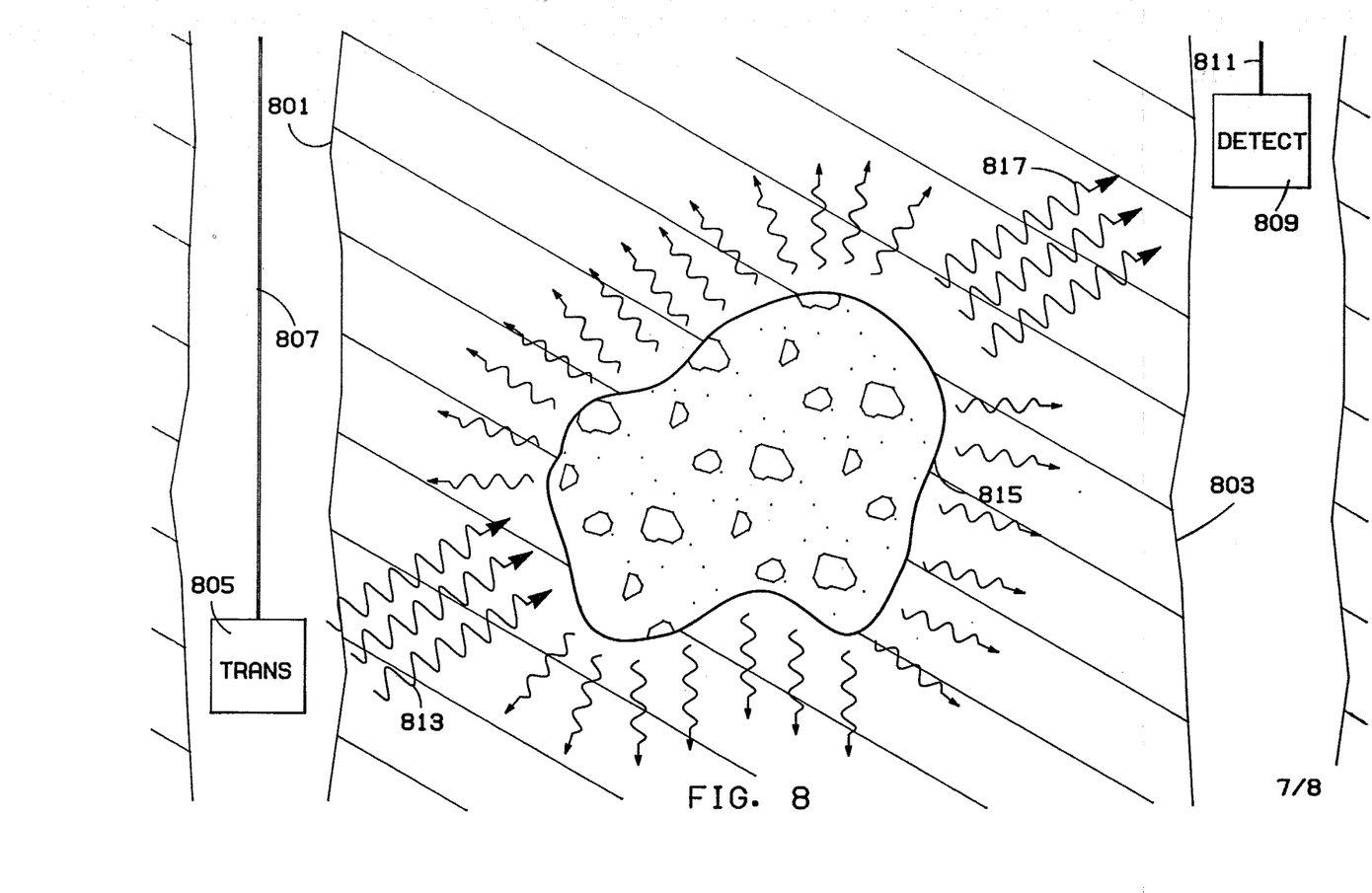
FIG. 8 shows a multiple borehole technique employing through-transmission measurements for locating and characterizing vugular zones.

FIG. 8 depicts yet another embodiment of the instant invention involving the use of two boreholes 801 and 803 with a transmitting acoustical transducer 805 being supported by a logging cable 807 in the first borehole and an acoustical energy detector 809 supported by logging cable 811 in the second borehole. This approach is suitable for use with either the pulse or continuous wave modes of the instant invention. Some of the transmitted acoustical waves 813 which strike vugular zone 815 continue on through the vugular zone and are sensed by detector 809. The through-transmitted signal 817 sensed by detector 809 will have a significantly diminished magnitude in certain regions of the frequency domain due to the presence of the vugular zone 815. The "signature" of the vugular zone using this technique is thus essentially an inverted version of the signatures associated with the techniques of FIGS. 6 and 7. Nonetheless, the basic concept is the same for all the above-described embodiments, i.e., a vugular zone will display a distinct frequency domain characteristic when varying frequency acoustical waves impinge upon it.

The techniques and results described above can be further refined to include the use of transmitting transducers therein that are designed mainly for the generation of shear waves. Upon encountering a vugular zone, the shear waves will be converted, for the most part, into reflected, scattered, and through-transmitted P-waves (i.e., compression waves). Thus, the detection of P-waves instead of the expected shear waves also suggests the presence of an anomaly which is nonsupportive of shear waves (e.g., liquid, gas, or possibly a vugular zone). The combination of a distinct frequency domain signature along with a shear wave to P-wave conversion would be strongly suggestive of a nearby vugular zone. Such information would be of great significance to petroleum explorationists.

Figure 9A:
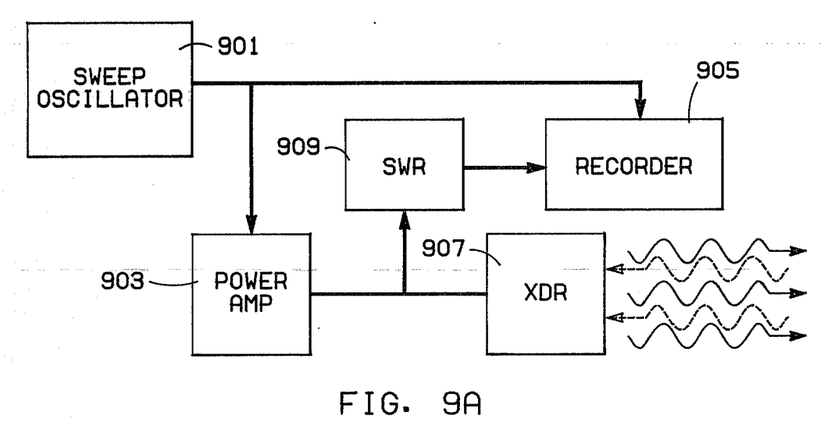
FIG. 9A shows a block diagram of apparatus suitable for implementing the standing wave generation and measurement technique of the instant invention.

FIG. 9A depicts a block diagram of apparatus suitable for implementing the single borehole continuous wave mode embodiment of the instant invention. Therein sweep oscillator 901 generates a signal similar to that depicted in FIG. 3. This signal is transmitted to a power amplifier 903 and a recorder 905. The amplified signal is then used to drive transducer 907 which is located in a borehole. Standing wave ratio detector 909 is connected to the transducer 907 and is used to measure any standing waves produced during the operation of the system. The output of the standing wave ratio detector 909 is also recorded by recorder 905 or by a separate recorder (not shown). Using this arrangement, a standing wave ratio versus frequency plot may be generated (similar to one of those shown in FIG. 4) and used for characterizing any vugular zones encountered.

Figure 9B:
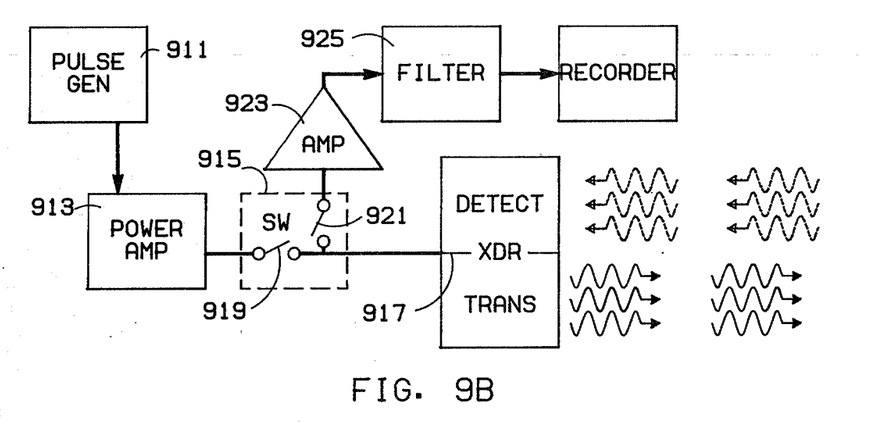
FIG. 9B depicts a block diagram of apparatus suitable for implementing the pulse reflection method of the instant invention.

FIG. 9B shows an implementation of apparatus for a pulse mode version of the instant invention wherein pulse generator 911 generates a series of pulses similar to those shown in FIG. 5A. These pulses are increased in magnitude by power amplifier 913 and transmitted through the electronic switching mechanism 915 to transducer 917. The driving pulses produced by the power amplifier 913 pass through the closed switch 919 to the transducer 917 while the switch 921 is held open. Once the transducer has converted the electrical pulse into an acoustical pulse and has transmitted the acoustical pulse out into the formation surrounding the borehole, switch 919 is opened and, simultaneously, switch 921 is closed. With this arrangement and synchronization, any reflection pulses returning back toward the borehole will be sensed and converted into an electrical signal by transducer 917 and transmitted through switch 921 to amplifier 923. The amplified signal may then be passed through a bandpass filter 925 for noise reduction before being transmitted to recorder 927. By properly timing the gap between generated pulses and by properly synchronizing the opening and closing of switches 919 and 921, a frequency domain signature of vugular zones in the vicinity of the borehole (such as described above in the discussion of FIG. 5) may be obtained.

Figure 9C:
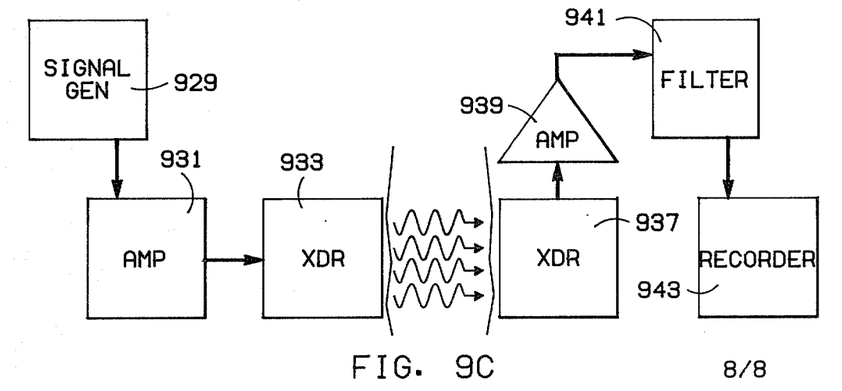
FIG. 9C shows a general block diagram of apparatus suitable for using the through transmission approach of the instant invention.

FIG. 9C depicts a block diagram of apparatus suitable for implementing the multiple borehole implementation of the instant invention. With this arrangement, signal generator 929 generates either a swept continuous wave signal or a pulse signal (as described above in FIGS. 3 and 5 respectively). The generated signal is enhanced by amplifier 931 to drive transducer 933. The acoustical signal generated by transducer 933 passes through the formation 935 located between the "transmitting" borehole and one or more "receiving" boreholes. In each of the "receiving" boreholes an acoustical signal detection transducer 937 is used to monitor the acoustical signals passing through the formation 935. These acoustical signals are converted into electrical signals by transducer 937 and are magnified by amplifier 939 before being passed through a bandpass noise-reduction filter 941. The filtered signals are then registered by recorder 943. With this arrangement the presence of a vugular zone between the transmitting and receiving boreholes will be shown by a decrease in received signal level at a particular location in the frequency spectrum.

The particular modes of implementation of the instant invention described above are intended only as examples and should not be considered to limit the invention to the embodiments shown—rather, the scope of the invention is defined by the appended claims.

What is claimed is:

1. A method for locating and characterizing porous subterranean zones, comprising the steps of:
    a. transmitting an acoustical signal into a subterranean formation, said acoustical signal comprising a range of frequency components;
    b. detecting resonant frequency peaks of a standing wave ratio resulting from the passage of said acoustical signal into a porous subterranean zone in the subterranean formation; and,
    c. determining borehole formation pore size.

2. The method of claim 1 wherein said detecting of said standing wave ratio is accomplished within a borehole from which said acoustical signal is transmitted.

3. The method of claim 1 wherein said acoustical signal comprises a swept-frequency, continuous wave signal.

4. The method of claim 1 wherein said acoustical signal comprises a time sequence of pulses, said sequence of pulses collectively containing frequency components covering a substantially continuous range of frequencies.

5. The method of claim 1 wherein the step of determining borehole formation pore size includes determining the approximate size of the pores in the porous subterranean zone by relating said size to the acoustical wave length associated with the peak frequency in said standing wave ratio.

6. The method of claim 1 and including the step of forming a standing wave ratio versus frequency representation.

7. The method of claim 6 wherein the step of determining borehole formation pore size in a subterranean zone includes determining the approximate pore size from said standing wave ratio versus frequency representation.

8. A method for locating and determining borehole formation pore size in a subterranean zone surrounding a well borehole utilizing a standing wave ratio of an acoustic signal imparted into the porous subterranean zone comprising the steps of:
    plotting the standing wave ratio as a function of the frequency spectrum of the acoustic signal; and
    determining the frequency of the acoustic signal at which the highest standing wave ratio occurs.

9. The method of claim 8 further including the step of relating the wave length associated with the highest standing wave ratio to approximate the size of pores in the porous subterranean zone.

* * * * *